(12) United States Patent
Gartrell

(10) Patent No.: US 7,596,395 B2
(45) Date of Patent: Sep. 29, 2009

(54) DEPRESSIBLE HINGE AND MOBILE STATIONS USING SAME

(75) Inventor: Andrew Julian Gartrell, Tarzana, CA (US)

(73) Assignee: Nokia Corporation, Espoo (FI)

( * ) Notice: Subject to any disclaimer, the term of this patent is extended or adjusted under 35 U.S.C. 154(b) by 794 days.

(21) Appl. No.: 10/970,177

(22) Filed: Oct. 21, 2004

(65) Prior Publication Data

US 2006/0089181 A1    Apr. 27, 2006

(51) Int. Cl.
*H04M 1/00* (2006.01)

(52) U.S. Cl. ............... 455/575.3; 455/90.3; 455/575.1; 379/433.13

(58) Field of Classification Search ............... 455/575.3, 455/90.3, 351, 347, 575.1; 16/281, 286, 16/232, 225; 361/680; 379/433.13, 433.01
See application file for complete search history.

(56) References Cited

U.S. PATENT DOCUMENTS

| | | | |
|---|---|---|---|
| 4,847,818 A * | 7/1989 | Olsen ........................ 368/10 |
| 5,363,089 A | 11/1994 | Goldenberg |
| 5,689,824 A * | 11/1997 | Nagai ..................... 455/575.3 |
| 5,692,046 A * | 11/1997 | Jambhekar ............ 379/433.13 |
| 5,890,052 A * | 3/1999 | Read et al. ............. 455/575.3 |
| 6,148,079 A | 11/2000 | Chintala et al. |
| 6,327,485 B1 * | 12/2001 | Waldron ................ 455/575.3 |
| 6,344,977 B1 | 2/2002 | Takagi |
| 6,684,089 B1 * | 1/2004 | Lee ....................... 455/575.3 |
| 6,934,568 B2 * | 8/2005 | Charlier et al. ........ 455/575.3 |
| 6,968,056 B2 * | 11/2005 | Barnett et al. ......... 379/433.13 |
| 7,016,712 B2 * | 3/2006 | Newman et al. ........ 455/575.3 |
| 7,016,715 B2 * | 3/2006 | Stetson ..................... 600/336 |
| 7,050,293 B2 * | 5/2006 | Arbisi et al. .............. 361/681 |
| 2003/0153284 A1 | 8/2003 | Minami et al. |
| 2004/0203507 A1 * | 10/2004 | Newman et al. ........... 455/90.3 |
| 2004/0266502 A1 | 12/2004 | Holtorf et al. |
| 2005/0054395 A1 * | 3/2005 | Arbisi et al. ............ 455/575.3 |

(Continued)

FOREIGN PATENT DOCUMENTS

EP    1 107 091 A2    6/2001

(Continued)

OTHER PUBLICATIONS

European Patent Office Search Report for EP Appl. 05796848.9; Feb. 25, 2009; 11 pages.

(Continued)

*Primary Examiner*—George Eng
*Assistant Examiner*—Brandon J Miller
(74) *Attorney, Agent, or Firm*—Alston & Bird LLP

(57) ABSTRACT

The present invention is directed to an opening mechanism for a mobile station. The mobile station includes a first portion foldably coupled to a second portion via a hinge region. The mobile station includes inner and outer surfaces, which are separated by opposing lateral edges provided therebetween. According to various embodiments, the opener is comprised of one or more opening members that extend axially from the first portion of the mobile station to the second portion. The one or more opening members include one or more laterally extending depressible portions. To open the mobile station, a user merely presses (or pinches) the one or more depressible portions laterally, inwardly, thereby driving the first portion of the mobile station to separate from the second portion.

31 Claims, 7 Drawing Sheets

U.S. PATENT DOCUMENTS

2005/0153737 A1    7/2005    Bailey
2006/0133052 A1*    6/2006    Harmon et al. ............. 361/752

FOREIGN PATENT DOCUMENTS

| | | | |
|---|---|---|---|
| GB | 2314179 A | 12/1997 | |
| GB | 2 355 043 A | 4/2001 | |
| GB | 2 380 765 A | 4/2003 | |
| WO | WO 2004/021682 A2 | 3/2004 | |
| WO | WO 2004/095717 A2 | 11/2004 | |

OTHER PUBLICATIONS

European Patent Office Search Report for EP Appl. 05796788.7; Feb. 24, 2009; 7 pages.

* cited by examiner

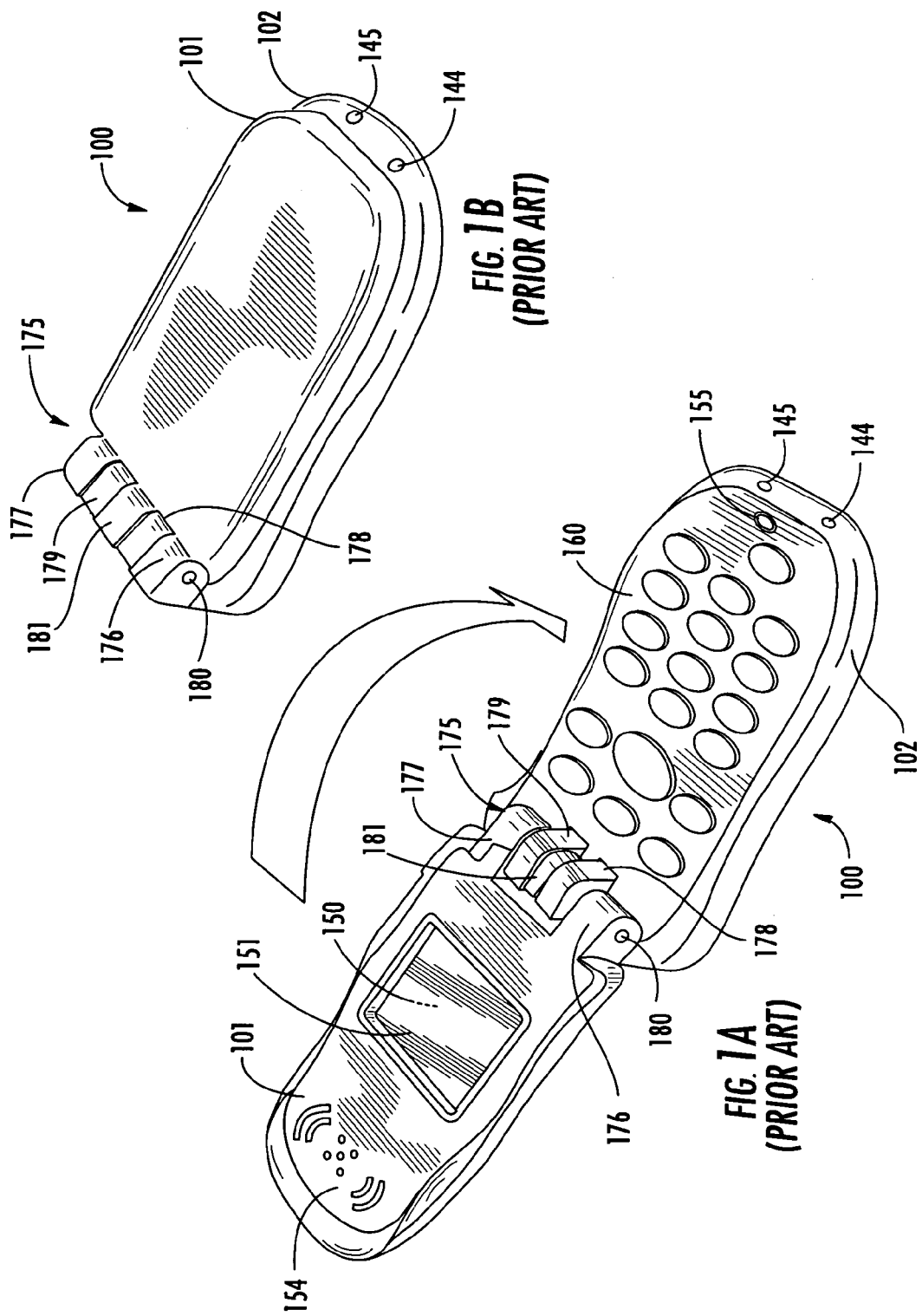

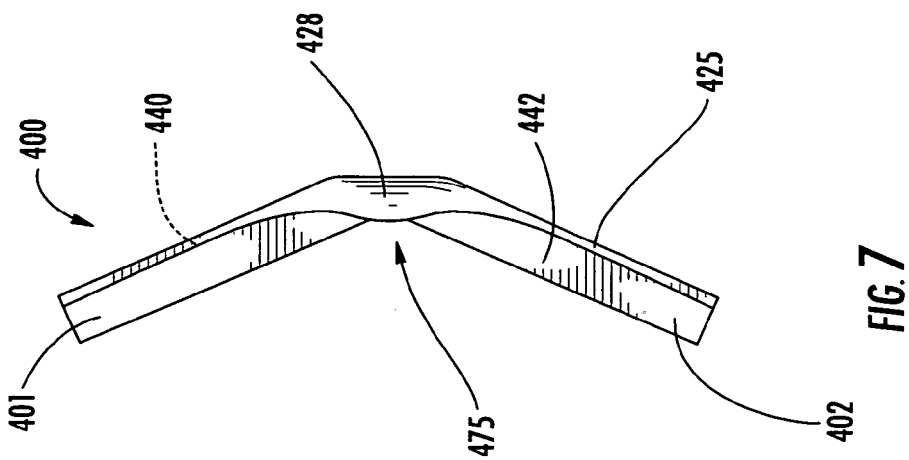
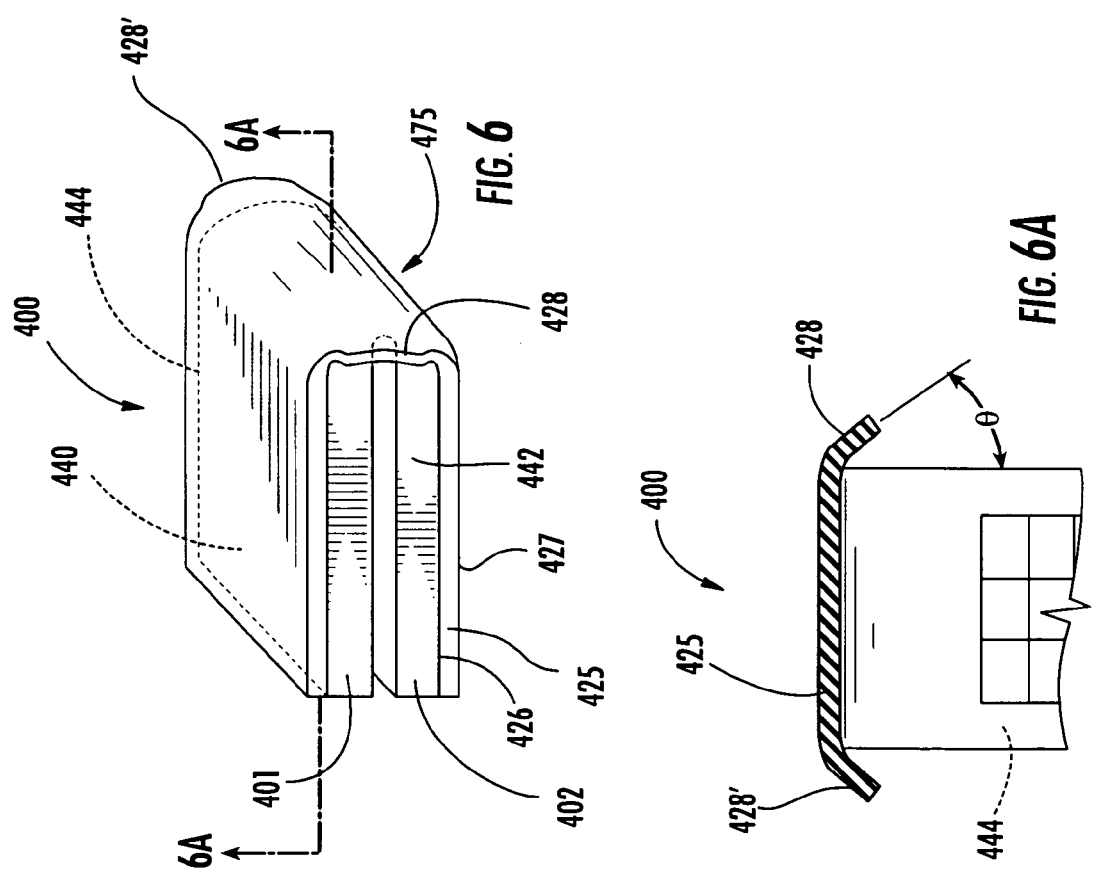

DEPRESSIBLE HINGE AND MOBILE STATIONS USING SAME

FIELD OF THE INVENTION

The present invention relates generally to mobile stations, and more specifically to a mobile station including an opening member having one or more depressible portions for manipulating the mobile station between open and folded positions.

BACKGROUND

The manufacture and design of today's mobile stations (also known as mobile phones, PDAs, pagers, laptop computers and the like) is constantly evolving. Early mobile station designs were necessarily large and bulky. The radio communications equipment and battery units necessary for their operation generally were carried in one oversized unit; although in at least one early and cumbersome design the unit was actually divided into two pieces which were then connected by a power cable. Advances in integrated circuitry and electricity storage technology have enabled mobile station designers to create smaller and smaller devices. These instruments are not only lighter, but also less cumbersome and easier to transport. For example, mobile stations are no longer required to be permanently installed in automobiles or connected to bulky separately-carried battery packs. Essentially, today's smaller, more useful mobile stations have simply become more fashionable.

Unfortunately, several drawbacks have followed this new fashionability and convenience. For example, the increased mobility of today's mobile stations has the unintended drawback of subjecting these mobile stations to an ever-increasing number of potentially damaging environments. For modern day consumers, these environments include pockets, briefcases, purses, gym bags, glove compartments and toolboxes where the mobile station can contact harmful solid objects and moisture that may cause structural and/or cosmetic damage to the relatively delicate internal and operational elements (e.g., LCD displays, microphone and speaker ports, keypads, etc.) of the mobile station. Accordingly, mobile stations are highly susceptible to damage. To make matters worse, market forces continue to drive mobile stations smaller, therefore, making it more difficult to add bulky structural reinforcements that might protect the mobile stations.

This risk of damage is exacerbated by the number of externally accessible components that are provided on modern mobile stations. One of the most prominent of these components is the visual display. Initially, such displays were limited to small, light emitting diodes (LEDs) that indicated whether the mobile station was "on" or, regarding mobile phones, whether a call was in progress. Gradually, more advanced LED displays were developed that were capable of displaying a dialed telephone number, the current time, or other simple information. More recently, liquid crystal displays (LCDs) have become commonplace. An LCD is made by sandwiching an electrically sensitive liquid-crystal material between two very thin pieces of glass or other transparent materials. They are, therefore, easily susceptible to damage by even a relatively minor impact. Despite the hard, transparent cover or similar protective device, generally added to limit this vulnerability, LCDs remain one of the most easily damaged components in modern mobile stations.

The folded mobile station design has developed, in part, to provide greater durability to modern mobile stations. As will become apparent, folded mobile stations also provide increased utility due to their relatively compact size. A folded mobile station is one that may be, generally speaking, folded from two parts into one more compact part. More specifically, as illustrated in FIGS. 1A-1C, folded mobile stations 100 are generally comprised of a first functional component 101 and a second functional component 102. The first and second functional components 101, 102 are mechanically coupled to one another by a hinge assembly 175 such that each may be folded over the other in a clam-shell type action. Accordingly, folded mobile stations 100 possess an "open" and a folded or "closed" position.

FIG. 1A provides one example of a conventional mobile station 100 (a mobile phone) oriented in the open position. As known to one of ordinary skill in the art, the first and second functional components 101, 102 of the mobile station 100 include various internal circuitry and operational elements. For example, the first functional component 101 is depicted as including a LCD 150. The LCD 150 is visible through, and protected by, a clear plastic cover 151. A speaker port 154 is comprised of a series of small openings formed in the first functional component 101 adjacent to an internal speaker (not shown). The first functional component 101 also typically includes circuitry for driving the LCD 150 and internal speaker (not shown).

The second functional component 102 of a conventional mobile station 100 generally includes a microphone port 155 that is adjacent to an internal microphone (not shown). A keypad 160 is also provided that is comprised of a series of keys extending through a plurality of openings from an otherwise internally disposed key mat. As with the first functional component 101, the second functional component 102 also houses the internal circuitry associated with the above described microphone 155 and keypad 160. An antenna for facilitating radio frequency (RF) communications (not shown) may be located in either the first functional component 101 or the second functional component 102, or may be distributed between them. Mobile station batteries (not shown) are typically stored in the second functional component 102, due to the limited space available in the first functional component 101 as a result of the LCD 150 and speaker 154 placement. An external power supply (not shown), such as an AC adaptor, may be connected through a power port 144. Similarly, external headphones (not shown) may be connected to the mobile station 100 at the external-device port 145.

When the mobile station is "opened," the user has access to the keypad 160 and can conveniently place the speaker port 154 and microphone port 155 in a position for voice communication. The mobile station 100 may also be "closed" by folding the first portion 101 to meet the second portion 102 in a clam-shell action as indicated by the arrow. FIG. 1B illustrates a known mobile station 100 in the closed position. Advantageously, the first functional component 101 and the second functional component 102 close in such a manner as to protect the keypad 160 and LCD 150. Generally speaking, known mobile stations 100 cannot be used in a closed configuration, although such functionality may be achieved by employing an external microphone and speaker (not shown). Such devices are often used in 'hands-free' operation, and are readily connected through an external-device port 145. As alluded to above, the folded design of modern mobile stations 100 is distinguishable over predecessors by accommodating safe storage on belts, in pockets, purses, or glove compartments without subjecting the sensitive internal components to damage from keys or other objects frequently encountered in such environments.

As should by now be apparent, folded mobile stations 100 possess features that are both useful and desirable to consumers. In addition to the durability and size improvements discussed above, many users prefer the aesthetics of folding designs over others. Despite the above improvements, the conventional folding mobile station design depicted in FIGS. 1A and 1B is still not optimal. For example, conventional folding mobile stations 100 use a cylindrical hinge assembly 175 similar to a standard door hinge to bind the first functional component 101 to the second functional component 102. As illustrated in FIG. 1C, this hinge assembly 175 is relatively complex, requires labor-intensive assembly operations, and may be costly to manufacture.

In particular, conventional hinge assemblies 175 are comprised of hinge members 176, 177 and 181 that extend from the first functional component 101, and hinge members 178 and 179 that extend from the second functional component 102. These hinge members 175-179 and 181 are held together by a hinge pin 180 that extends through openings (not shown) formed in each hinge member. During assembly, the hinge pin 180 must be carefully inserted through the openings provided in the hinge members 175-179 and 181, and also must be threaded through a pre-assembled spring 182, a profile indent part (dynamic) 183, a profile indent part (static) 184 as shown in FIG. 1C. These latter components are provided to maintain the mobile station 100 in either an open or closed position as known to one of ordinary skill in the art. Finally, a flexible printed circuit or cable bundle 185 must be awkwardly wrapped around the pin 180 to ensure that the first functional component 101 is electrically connected to the second functional component 102.

As will be apparent to one of ordinary skill in the art, the complexity of the above hinge design results in cost-prohibitive and bulky hinge assemblies. For example, the above hinge assembly requires precision elements, high part counts, and relatively long assembly times that all add to the manufactured cost. In addition, the complex prior art hinge designs hinder the ability of designers to make stylish modifications. In light of the foregoing, it would be highly desirable to provide an improved hinge design for a foldable mobile station that is relatively simple to assemble and compliments the overall aesthetic appeal of the mobile station. Furthermore, it would be desirable to provide a hinge design that maintains the durability and size benefits realized by the development of modern foldable mobile stations.

BRIEF SUMMARY OF THE INVENTION

The present invention is directed to an opener for a mobile station. The mobile station includes a first portion foldably coupled to a second portion adjacent a hinge region. The mobile station includes inner and outer surfaces, which are separated by opposing lateral edges provided therebetween. According to various embodiments, the opener is comprised of two opening members extending axially from the first portion of the mobile station to the second portion. In such embodiments, the opening members are at least partially comprised of rubber, polymer materials, elastomer materials, metal, fabric, composite materials, or other similar materials as known in the art. In one embodiment, the opening members define laterally extending depressible portions adjacent the hinge region of the mobile station. In one embodiment, the depressible portions are configured to receive an actuation force, upon application of which, the mobile station is opened. In one embodiment, the mobile station is opened by a user merely pressing (or pinching) the depressible portions laterally, inwardly, thereby driving the first portion of the mobile station to separate from the second portion. The mobile station is closed, in one embodiment, by simply releasing the one or more depressible portions. In other embodiments, this closing action may be enhanced by springs, elastic bands or other biasing devices known in the art.

In various embodiments, the opening members are configured to extend adjacent lateral edges of the first and second portions of the mobile station. In one embodiment, the opening members extend along the inner surface of the mobile station. In another embodiment, the inner surface of the mobile station defines a narrowed region adjacent the hinge region. In this embodiment, the opening members extend along the narrowed region of the inner surface of the mobile station to define the laterally extending depressible portions referenced above. Regardless of whether the inner surface of the mobile station has been narrowed, in various embodiments, the first and second depressible portions extend angularly outwardly from the inner surface of the mobile station to define pressing surfaces. In one embodiment, the pressing surfaces of the depressible portions extend angularly outwardly from the inner surface of the mobile station toward the outer surface of the mobile station. In various embodiments, the pressing surfaces define an angle relative to the inner surface of between 1 and 45 degrees, more preferably between 1 and 20 degrees, and still more preferably between 1 and 10 degrees.

In one embodiment, the opening members are attached (e.g., affixed via a 2-shot molding, injection molding, adhesives, or other similar techniques as known in the art) to the inner surface of the mobile station. In other embodiments, the opening members are integral to the inner surface of the mobile station. In still other embodiments, a lock or other similar mechanical device may be provided to maintain the mobile phone of the present invention in an open position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 1A, 1B, and 1C are views of one example of a conventional foldable mobile station (i.e., mobile phone) according to the known prior art; wherein FIG. 1A is a perspective view of the mobile station in an open configuration, FIG. 1B is a perspective view of the mobile station in a folded configuration, and FIG. 1C is a section view of the conventional cylindrical hinge assembly depicted in FIGS. 1A and 1B according to the known prior art;

FIG. 6 is a perspective view of a closed mobile station according to one embodiment of the invention;

FIG. 6A is a detail section view of the mobile station depicted in FIG. 6, taken along section lines 6A-6A; and FIG. 7 is a side view of the mobile station depicted in FIG. 6 placed in an "opened" position.

DETAILED DESCRIPTION OF THE INVENTION

The present inventions now will be described more fully hereinafter with reference to the accompanying drawings, in which some, but not all elements of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1C:
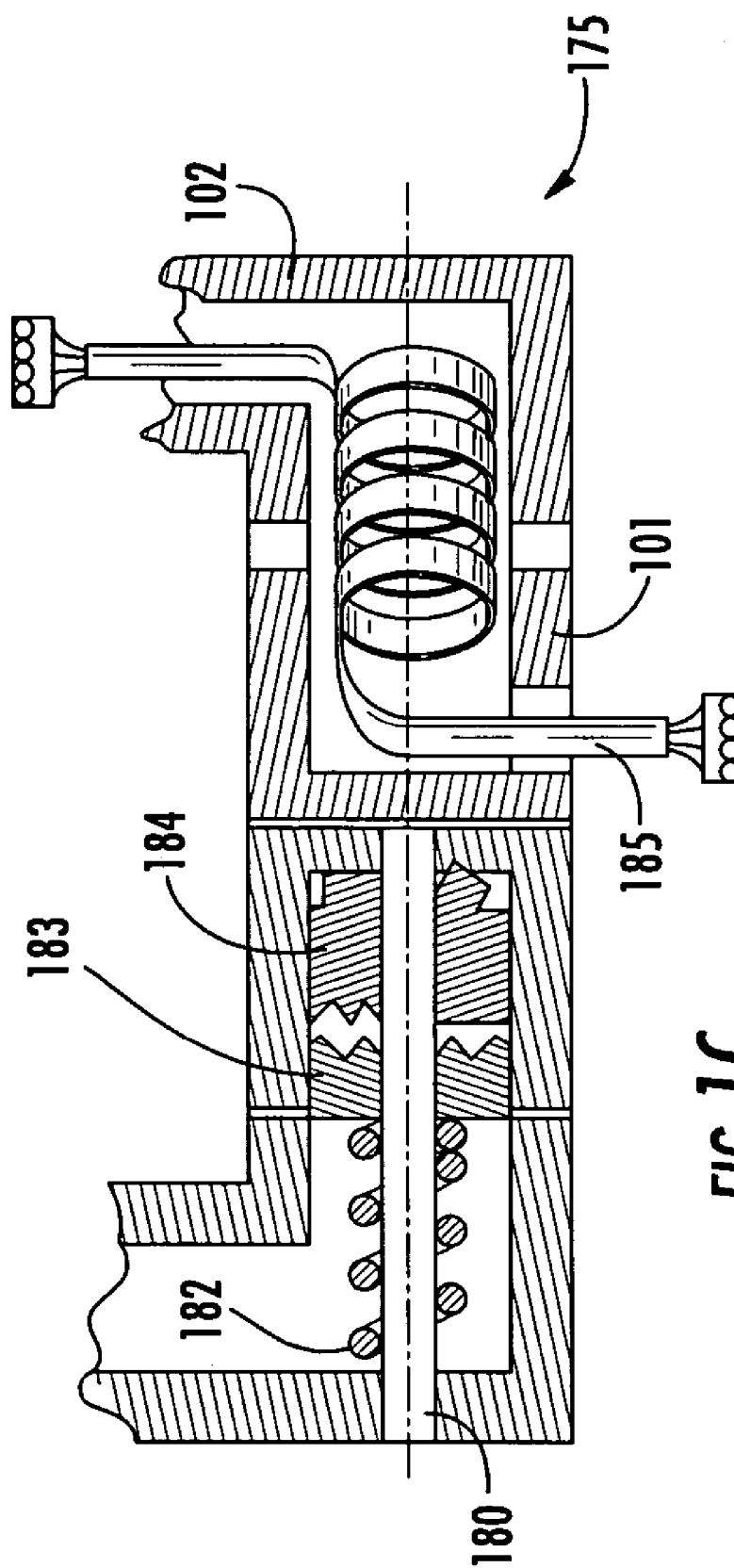
Figure 2:
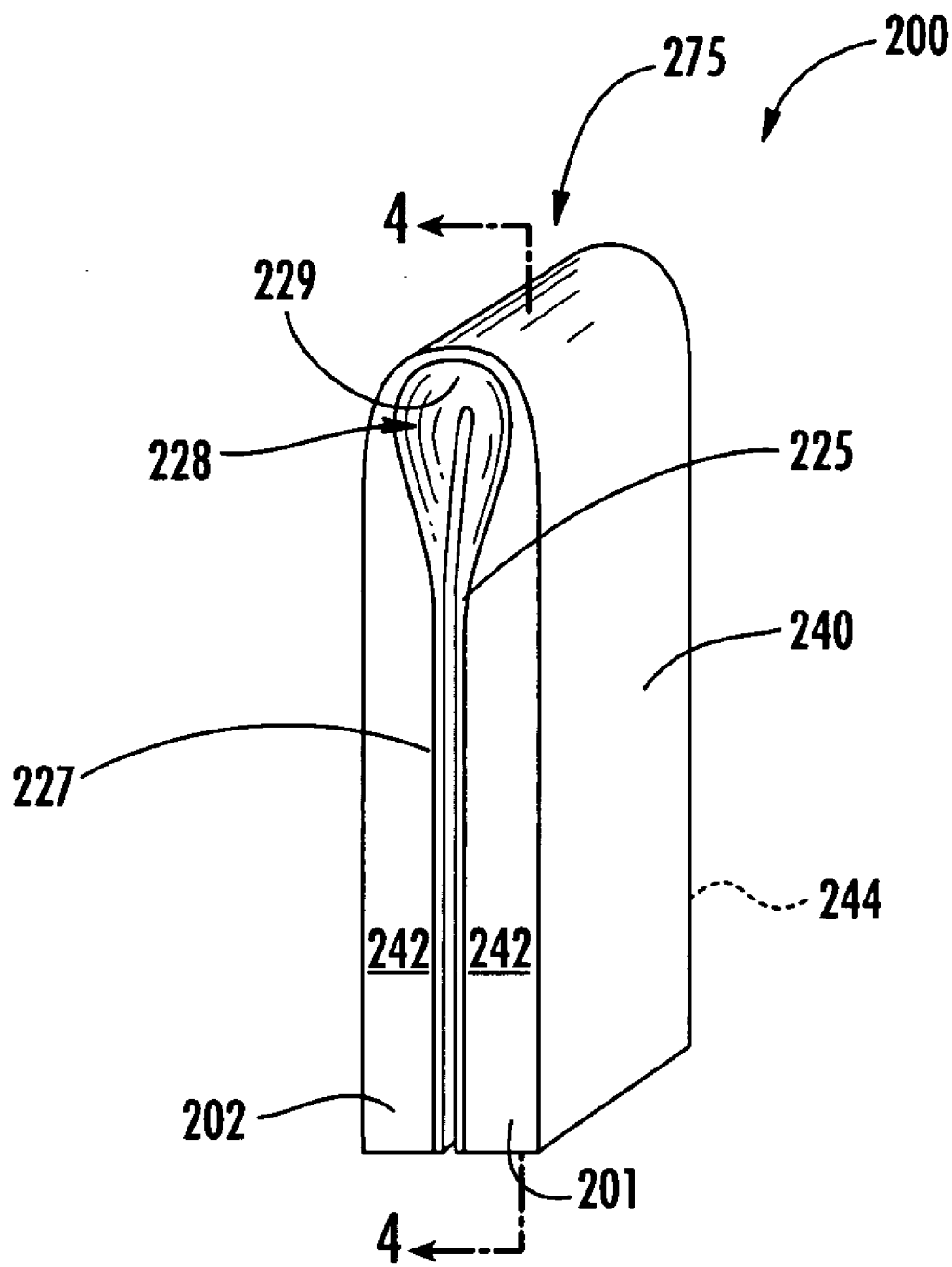
FIG. 2 is a perspective view of a mobile station placed in a "folded" position in accordance with one embodiment of the invention.

Referring to FIG. 2, there is illustrated a mobile station 200, in accordance with one embodiment of the present invention. For the purposes of the following specification and appended claims, the term "mobile station" refers to mobile phones, PDAs, pagers, calculators, laptop computers, and other similar foldable electronic devices as commonly known in the art. The mobile station 200 (such as a mobile phone) includes a first portion 201 and a second portion 202 foldably coupled together via a hinge region 275. In the depicted embodiment, the mobile station 200 is configured in a "folded" position.

The first portion 201 is electrically connected to the second portion 202 as known in the art. For example, the first and second portions 201, 202 may be electrically connected by a flexible electrical connector or other similar means. In various embodiments, the electrical connector (not shown) may take on other specific tasks, such as providing a receiving or transmitting antenna or facilitating various internal electronic circuitry. In these embodiments, the electrical connector may include conductive leads printed on a Flexible Printed Circuit (FPC), coaxial cable, or alternatively, may include conductors or other devices for optical transmission, inductive near field transmission or short range transmissions such as Bluetooth, RFID, 802.11 and the like.

Figure 3:
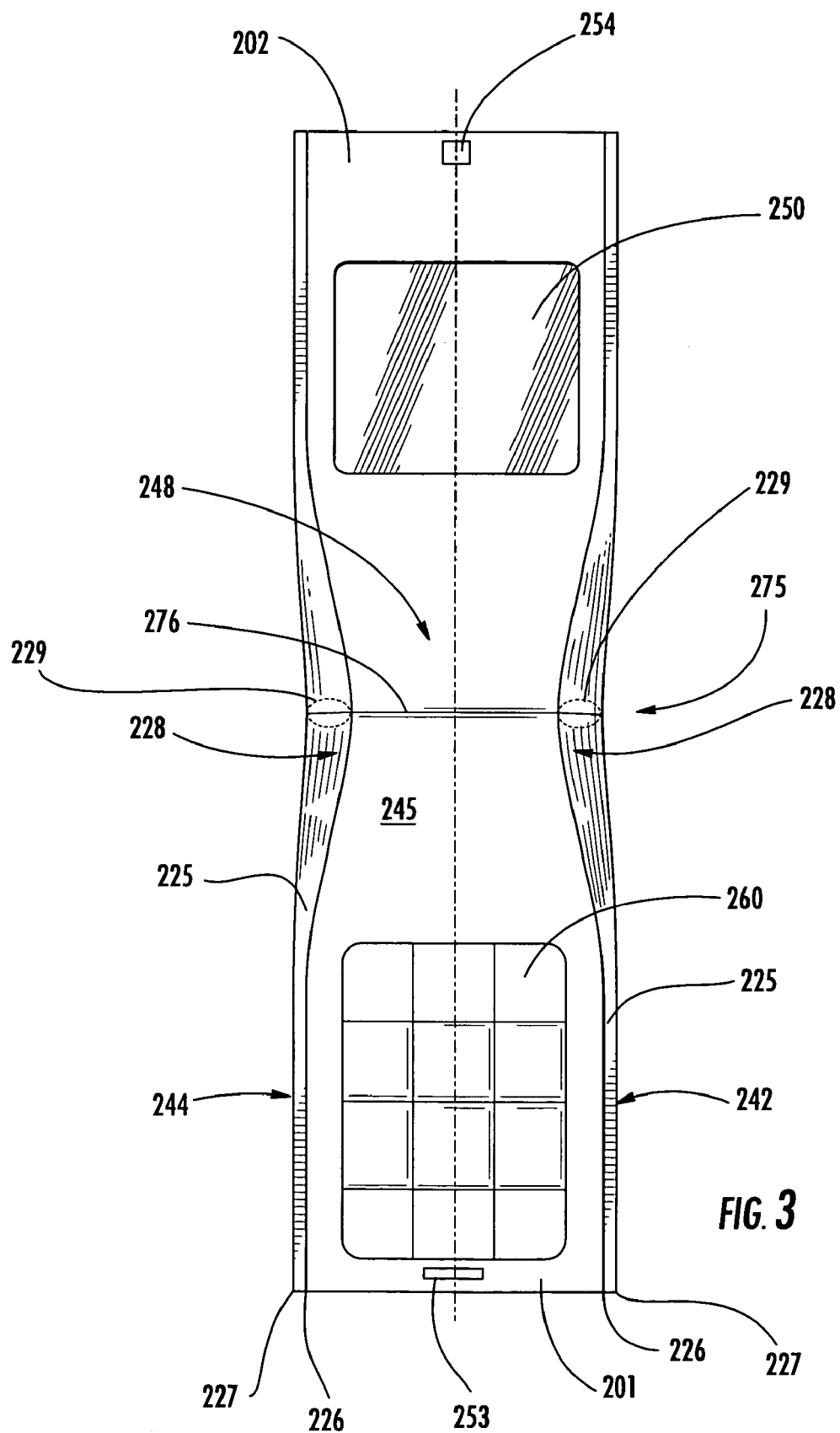
FIG. 3 is a perspective view of the mobile station of FIG. 2 placed in an "opened" position.

As best illustrated by FIGS. 2 and 3 collectively, the mobile station 200 includes an outer surface 240, an opposed inner surface 245, and two lateral edge surfaces 242, 244 defined therebetween. The mobile station body or housing is typically comprised of a durable polymer, composite material or metal as known in the art. In several embodiments, the mobile station 200 includes a plurality of relatively delicate operational elements (e.g., a display 250, a keypad 260, a speaker port 254, a microphone port 253, etc.) disposed on or integral to its first and second portions 201, 202. Accordingly, when the mobile station 200 is configured in the folded position shown in FIG. 2, the plurality of delicate operational elements are protected from potentially damaging impacts and other contact with foreign substances. Although FIG. 3 depicts certain operational elements adjacent either the first or second portions 201, 202, it is important to note that the present invention is not limited by the depicted configuration; in fact, the depicted operational elements may be disposed adjacent either the first or second portions 201, 202 of the mobile station 200 as known in the art.

For the purposes of the present specification and appended claims, the term "axial" refers to a direction defined by the longitudinal axis (e.g., dashed centerline of FIG. 3) of the first and second portions 201, 202 of the mobile station 200. As will be apparent to one of ordinary skill in the art, a component need not be positioned along the centerline of the first and second portions 201, 202 of the mobile station to be axially extending; rather, the component need only extend substantially parallel to the plane defined by the mobile station's centerline or longitudinal axis. Alternatively, a transverse or lateral direction is defined perpendicular to the axial direction.

As referenced above, the first and second portions 201, 202 of the mobile station 200 are foldably coupled together adjacent a hinge region 275. In various embodiments, a hinge 276 is defined within the hinge region 275 having a variety of hinge designs as known in the art. For example, FIG. 3 illustrates a book style hinge wherein the inner surfaces of the first and second portions 201, 202 are captured in face-to-face alignment within the hinge region 275 of the mobile station by a clamp (not shown). In other embodiments, a simple cylindrical hinge (not shown) may be used. In other embodiments, the first and second portions 201, 202 may include unitary inner and/or outer surfaces 245, 240; each having a foldable portion disposed adjacent the hinge region 275, thereby accommodating a wallet style hinge action.

Various embodiments of the present invention are directed to opening members 225 extending between the first and second portions 201, 202 of a mobile station 200. The opening members 225 allow a user to quickly and simply manipulate the mobile station 200 between open and folded positions as described in detail below. In various embodiments, opening members 225 are comprised of resilient, durable materials such as polymer materials, rubber, elastomer materials, metals, and/or composite materials. The aesthetic appeal of the mobile station may be enhanced by various fabrics and other relatively soft materials.

In one embodiment, a mobile station 200 according to the present invention comprises two opening members 225 as shown in FIG. 3. The opening members 225 extend between the first and second portions 201, 202 of the mobile station 200 adjacent its lateral edges 242, 244 as shown. In one embodiment, the opening members 225 include outer edges 227 configured to track the contour of the lateral edges 242, 244 of the mobile station. The opening members 225 also define inner edges 226 configured to run along the inner surface 245 of the mobile station as shown. As a result, the opening members 225 are defined between the inner edges 226 and the outer edges 227.

In one embodiment, the opening members 225 extend outwardly at a desired angle from the inner surface 245 of the mobile station adjacent the hinge region 275, thereby defining depressible portions 228 as collectively shown in FIGS. 2 and 3. The depressible portions 228 extend at a desired angle between the inner surface 245 and outer surfaces 240 of the mobile station as shown in FIG. 2. In one embodiment, the inner surface 245 of the mobile station defines a narrowed region 248 as shown. In another embodiment, the inner edges 226 of the depressible portions 228 track the contour of the narrowed region 248 of the inner surface 245, thereby defining depressible portions 228 having a width adjacent the hinge region 275 that is greater than the remainder of the opening members 225. As a result, the depressible portions 228 may have a tab or wing-like structure as shown. In another embodiment, the depressible portions 228 define outwardly directed, angularly extending, pressing surfaces 229 that allow users to manipulate the mobile station 200 between open and folded positions. For purposes of the present specification and appended claims the term "angularly extending" refers to the angle or angular relationship defined between the pressing surface 229 and the inner surface 245 of the mobile station 200.

Figure 4:
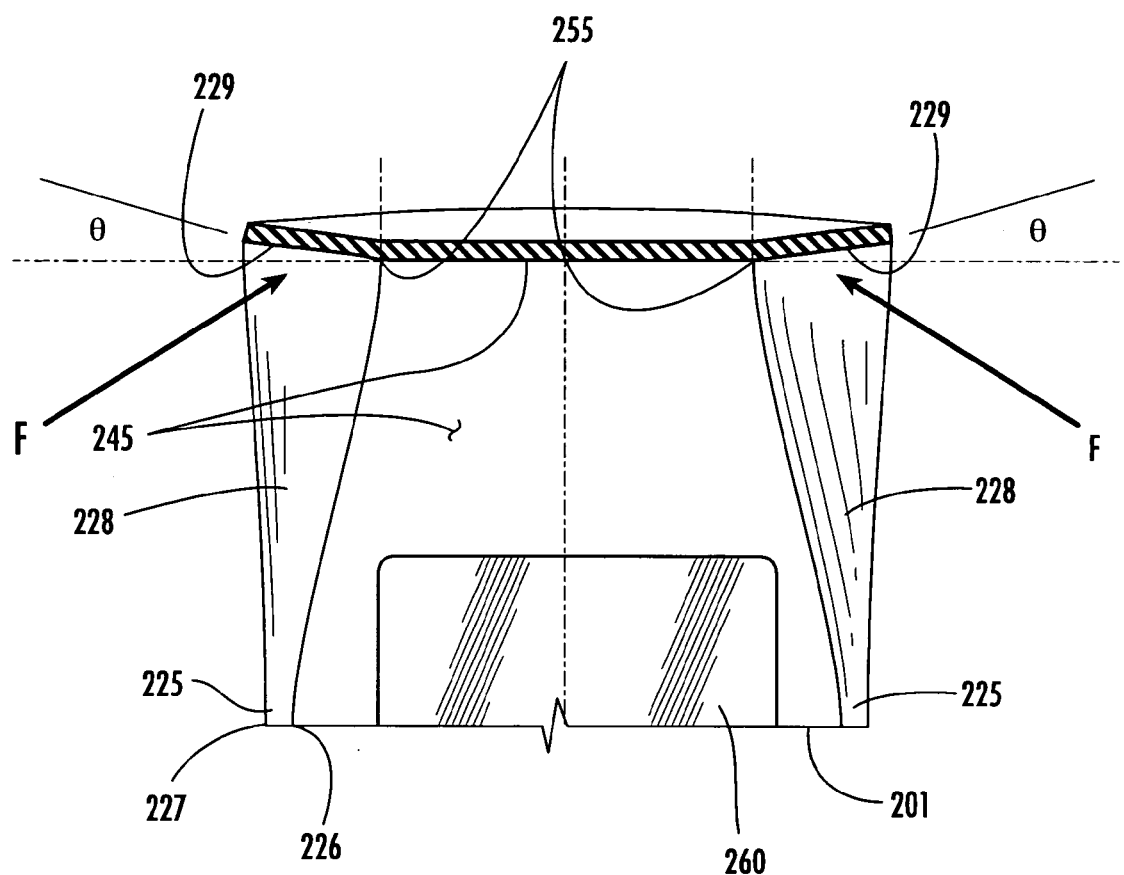
FIG. 4 is detail section view of the mobile station embodiment depicted in FIG. 2, taken along section lines 4-4.

FIG. 4 is a section view of a folded mobile station 200 having angularly extending pressing surfaces 229 according to one embodiment of the invention. In the depicted embodiment, the pressing surfaces 229 are defined adjacent the hinge region 275 of the folded mobile station 200 between the inner and outer edges 226, 227 of the opening members 225. In one embodiment, hinge points 255 are defined where the inner edges 226 of the opening members 225 meet the inner surface 245 of the mobile station as shown. The pressing surfaces 229 extend outwardly from the hinge points 255 to define a bias angle θ. In various embodiments, the bias angle θ is between 0 and 45 degrees, more preferably between 0 and 20 degrees, and still more preferably between 0 and 10 degrees. In additional embodiments, the bias angle need not be uniform along the length of the depressible portion 225. For example, in one embodiment, the bias angle θ may be greatest adjacent the hinge region and gradually decrease as the depressible portion 225 extends axially toward either end of the mobile station.

To manipulate the mobile station 200 between the folded position depicted in FIG. 2 and the open position depicted in FIG. 3, a user simply applies an actuation force by pressing (or pinching) the pressing surfaces 229 of the opening members 225 laterally, inwardly, generally along force arrows F shown in FIG. 4. As will be apparent to one of ordinary skill in the art, an actuation force F applied to the pressing surfaces 229 deflects the pressing surfaces rearwardly (relative to the inner surface), creating force moments through the depressible portions 228 that cause the first and second portions 201, 202 of the mobile station 200 to separate. In one embodiment, the actuation force F may be applied perpendicular to pressing surfaces 229 to achieve efficient separation of the first and second portions 201, 202. In other embodiments, as will be apparent to one of ordinary skill in the art, the outer portions of the pressing surfaces 229 may include a radius, chamfer, or secondary angled portion (not shown) to accommodate actuation forces F that are substantially laterally directed.

In the depicted embodiment, a user presses the pressing surfaces 229 of the opening members 225 to transition from a folded position (FIG. 2) to an opened position (FIG. 3). To return to the folded position, a user simply releases the pressing surfaces 229 of the opening members 225, allowing gravity to close the first or second portions 201, 202 of the mobile station 200. In hand-held embodiments (e.g., mobile phones, PDAs and the like), the above pressing and releasing steps may be performed by pinching and releasing the pressing surfaces 229 between a user's thumb and one or more fingers. Various springs, hinges, elastic retainers, or other biasing devices may be employed according to several embodiments to bias the mobile station 200 toward the folded position. This "snap shut" type design may require users to overcome this biasing force when opening the mobile station 200 by firmly pressing the depressible portion 228 of the opening member 225. In that regard, it is desirable for depressible portions 228 according to various embodiments to possess a sufficient stiffness such that they resist bending and instead transfer the opening force to the first and second portions 201, 202 of the mobile station 200. In various embodiments, the opening members 225 may be comprised of materials having ample flexibility, which are also quite resilient in compression, such as elastomers having a Shore Hardness of between 60-70 A. In other embodiments of the invention, locking devices may be provided to counteract any folding bias so as to preserve a mobile station in its open position during use.

Figure 5:
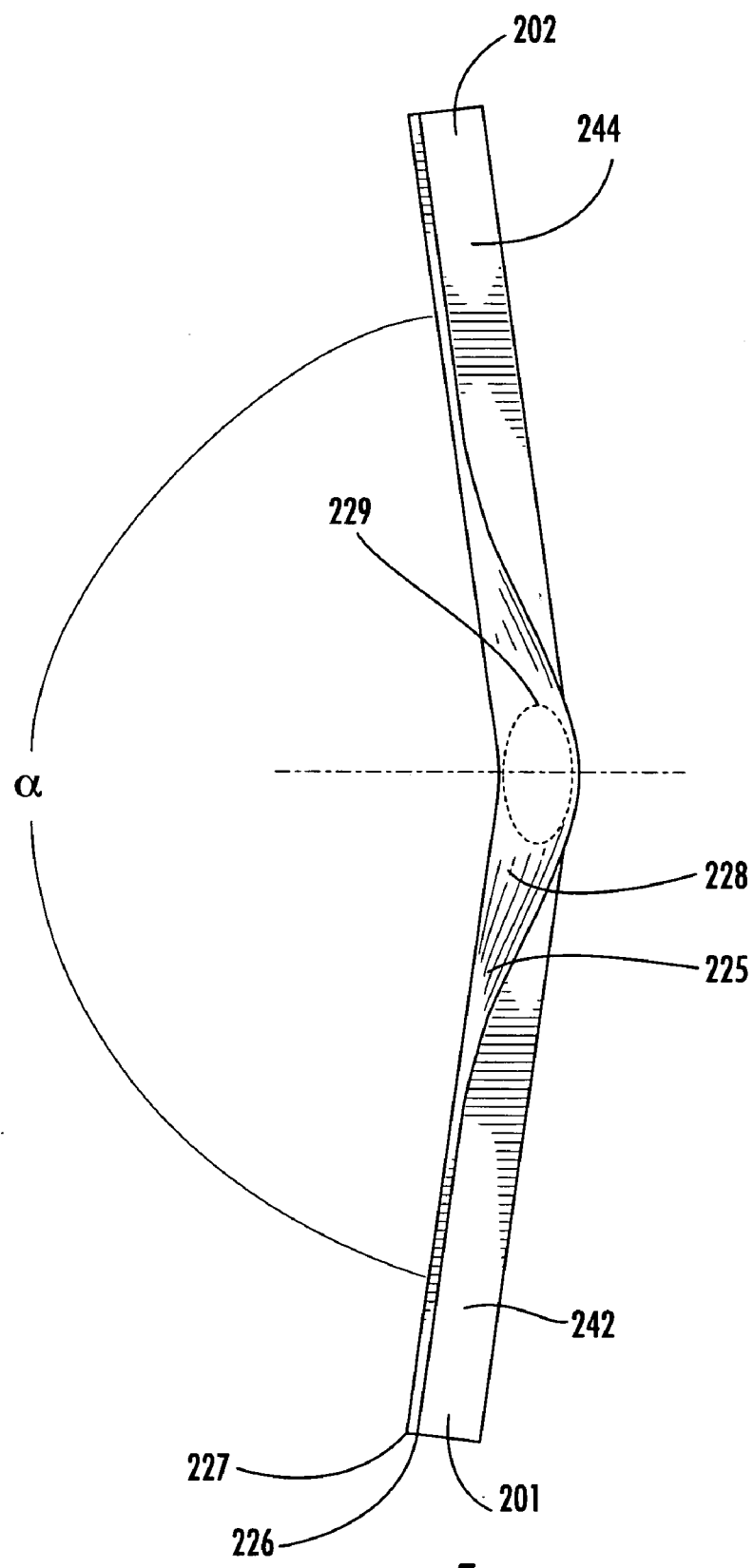
FIG. 5 is a side view of an opened mobile station according to one embodiment of the invention.

FIG. 5 depicts a side view of an opened mobile station 200 in accordance with one embodiment of the invention. In various embodiments, the extent to which the first and second portions 201, 202 of a mobile station 200 are "opened" may change depending upon the application. For example, mobile phone embodiments may define an operation angle α (shown in FIG. 5) between the first and second portions 201, 202 of between 150° and 180°, while in other applications (e.g., laptop computers) the preferred operation angle α may be considerably less. To achieve a desired operation angle α, various frames, hinge designs, and locks may be used as known in the art. Alternatively, in several embodiments of the present invention, such devices are not necessary as the user may adjust the opening angle α to a desired configuration merely by applying more or less pinching pressure to the depressible portions of the mobile station. For example, in one embodiment, by applying a relatively strong pinching force the mobile station may be opened to a wide open configuration of 150-180 degrees. While in another embodiment, a relatively weak pinching force may be applied to open the mobile station to a moderately open configuration of 100-145 degrees. As a result, in hand-held mobile station embodiments, such as mobile phones, the first and second portions of the mobile station are able to more naturally conform to the contour of a user's head during operation.

Although depicted in the FIGS. 1-5 as having two opposed opening members (and two opposed depressible portions), the present invention is not limited to such a configuration. In alternate embodiments, mobile stations according to the present invention may be provided having a single opening member and depressible portion configured along one lateral edge of the mobile station (not shown). As will be apparent to one of ordinary skill in the art, such embodiments may configured as described above wherein a pinching action is used to open the mobile station; however, in such single opening member embodiments one of the user's thumb or forefinger are simply positioned adjacent an opposed lateral edge surface of the mobile station rather than adjacent an opposed depressible portion as referenced above. As will be apparent to one of skill in the art, a variety of springs, bands, or other mechanical devices may be used to overcome any lessened mechanical advantage provided by employing only one rather than two opening members.

FIGS. 6 and 7 depict a mobile station 400 in accordance with another embodiment of the present invention. The depicted embodiment includes opening members operating very similar to the opening members described in FIGS. 2-5; however, the opening members 425 of FIGS. 6 and 7 include a slightly differing structure. In particular, rather than being disposed adjacent the inner surface 445 of the mobile station as referenced above, the present embodiment includes an opening member 425 that is configured adjacent the outer surface 440 of the mobile station 400. In various embodiments, the opening member 425 may be a single integral surface (as shown) or may be broken into two surfaces (one disposed along each lateral edge 442, 444). In still other embodiments, the opening member 425 may be disposed adjacent and affixed to the outer surface 440 of the mobile station 400, or alternatively, may be formed integral to the outer surface 440.

As described above, the opening member 425 includes at least one depressible portion 428 configured adjacent the hinge region 475 of the mobile station 400. In one embodiment, the opening member 425 defines at least one exterior edge 427 that extends substantially adjacent at least one lateral edge 442 of the mobile station 400. As the exterior edge 427 of the opening member 425 reaches the hinge region 475 of the mobile station 400, the exterior edge 427 extends laterally, outwardly, beyond the lateral edge 442 of the mobile station 400. As a result, the opening member 425 defines a depressible portion 428 as shown in greater detail by FIGS. 6A and 7.

In one embodiment, the opening member 425 is a single body extending at least partially over (or integral to) the outer surface 440 of the mobile station 400. In such embodiments, the opening member 425 defines two substantially opposed depressible portions 428, 428', extending laterally outwardly from the lateral edges 442, 444 of the mobile station 400. In other embodiments, a single depressible portion 428 may be provided. In another embodiment, as referenced above, first and second opening members may be provided each extending adjacent the lateral edge of the mobile station (not shown). In such embodiments, each opening member includes a depressible portion extending laterally outwardly from the lateral edges of the outer surface of the mobile station.

In various embodiments of the present invention, an angle θ is defined between the one or more outwardly extending depressible portions 428, 428' and the lateral edges 442, 444 of the mobile station 400 as shown in FIG. 6A. In one embodiment, angle θ is preferably between 0 degrees and 270 degrees, more preferably between 30 and 150 degrees, and still more preferably between 60 and 120 degrees. As will be apparent to one of ordinary skill in the art, for initial depressible portion angles θ that are less than 90 degrees, a user opens the mobile station 400 by pressing the one or more depressible portions 428, 428' inwardly toward smaller angles (i.e., toward angles θ which are less than 90 degrees). For initial depressible angles θ that are greater than 90 degrees, a user opens the mobile station 400 by pressing the one or more depressible portions inwardly to achieve larger angles (i.e., toward angles θ which are greater than 90 degrees). Regardless of the angular configuration of the one or more depressible portions 428, 428' a user advantageously opens the mobile station 400 simply by pinching the depressible portions 428, 428' between the user's thumb and forefinger.

Many modifications and other embodiments of the inventions set forth herein will come to mind to one of ordinary skill in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mechanism for opening a mobile station, comprising:
an opening member extending axially from a first portion of said mobile station to a second portion of said mobile station, wherein said first and second portions are foldably coupled together by a hinge region, said opening member defining a laterally extending depressible portion configured to be responsive to an actuation force applied laterally, inwardly, and wherein said actuation force at least partially drives said mobile station to at least partially open from a folded position.

2. The mechanism of claim 1, wherein:
said opening member extends adjacent a lateral edge of said mobile station.

3. The mechanism of claim 1, wherein said opening member comprises:
a first opening member extending adjacent a first lateral edge of said mobile station, said first opening member defining a first laterally extending depressible portion adjacent said hinge region; and
a second opening member configured to extend adjacent a second lateral edge of said mobile station, said second opening member defining a second laterally extending depressible portion adjacent said hinge region, wherein said first and second laterally extending depressible portions are configured to be responsive to first and second actuation forces applied laterally, inwardly, and wherein said first and second actuation forces at least partially drive said mobile station to at least partially open from a folded position.

4. The mechanism of claim 1, wherein:
said mobile station defines opposed inner and outer surfaces, said inner surface defines a narrowed region proximate to said hinge region, and said opening member extends along said narrowed region of said inner surface to define said depressible portion.

5. The mechanism of claim 4, wherein:
said depressible portion includes an angularly extending pressing surface extending outwardly from said inner surface.

6. The mechanism of claim 1, wherein:
said mobile station defines opposed inner and outer surfaces, said inner surface defines a narrowed region proximate to said hinge region, and said depressible portion of said opening member extends angularly outwardly from said narrowed region of said inner surface to define a pressing surface.

7. The mechanism of claim 6, wherein:
said pressing surface of said depressible portion of said opening member extends angularly outwardly from said narrowed region of said inner surface at an angle between 1 and 45 degrees.

8. The mechanism of claim 6, wherein:
said pressing surface of said depressible portion of said opening member extends angularly outwardly from said narrowed region of said inner surface at an angle between 1 and 20 degrees.

9. The mechanism of claim 6, wherein:
said pressing surface of said depressible portion of said opening member extends angularly outwardly from said narrowed region of said inner surface at an angle between 1 and 10 degrees.

10. The mechanism of claim 1, wherein:
said mobile station defines opposed inner and outer surfaces and said depressible portion of said opening member extends angularly outwardly from said outer surface to define a pressing surface.

11. The mechanism of claim 1, wherein:
said opening member is at least partially comprised of rubber.

12. The mechanism of claim 1, wherein:
said opening member is at least partially comprised of fabric.

13. The mechanism of claim 1, wherein:
said opening member is at least partially comprised of an elastomer.

14. The mechanism of claim 1, wherein:
said opening member is at least partially comprised of metal.

15. The mechanism of claim 1, wherein:
said mobile station defines opposed inner and outer surfaces, wherein at least a portion of said depressible portion of said opening member extends laterally outwardly beyond said outer surface of said mobile station.

16. The mechanism of claim 1, wherein:
said opening member is attached to said first and second portions of said foldable mobile station.

17. A mobile station, comprising:
a first portion;
a second portion foldably coupled to said first portion adjacent a hinge region; and
opposed first and second opening members extending axially from said first portion to said second portion, said first and second opening members defining laterally extending first and second depressible portions disposed on opposite sides of said hinge region, wherein said depressible portions are configured to be responsive to a pinching force that at least partially drives said first and second portions of said mobile station to at least partially open.

18. The mobile station of claim 17, wherein:
said mobile station defines opposed inner and outer surfaces, said inner surface defines a narrowed region proximate to said hinge region, and said first and second opening members extend along said narrowed region of said inner surface to define said first and second depressible portions.

19. The mobile station of claim 17, wherein:
said mobile station defines opposed inner and outer surfaces, said first and second depressible portions of said first and second opening members extend outwardly at an angle relative to said inner surface of said mobile station.

20. The mobile station of claim 19, wherein:
said angle is between 1 and 45 degrees.

21. The mobile station of claim 19, wherein:
said angle is between 1 and 20 degrees.

22. The mobile station of claim 19, wherein:
said angle is between 1 and 10 degrees.

23. The mobile station of claim 17, wherein:
said mobile station defines opposed inner and outer surfaces, said inner surface defines a narrowed region proximate to said hinge region, and said first and second depressible portions of said first and second opening members extend angularly outwardly from said narrowed region of said inner surface to define first and second pressing surfaces.

24. The mobile station of claim 17, wherein:
said mobile station defines opposed inner and outer surfaces, said first and second depressible portions of said first and second opening members extend angularly outwardly from said outer surface to define first and second pressing surfaces.

25. The mobile station of claim 17, wherein:
said first and second opening members are at least partially comprised of rubber.

26. The mobile station of claim 17, wherein:
said first and second opening members are at least partially comprised of fabric.

27. The mobile station of claim 17, wherein:
said first and second opening members are at least partially comprised of elastomer materials.

28. The mobile station of claim 17, wherein:
said first and second opening members are at least partially comprised of metal.

29. The mobile station of claim 17, wherein:
said mobile station defines opposed inner and outer surfaces, wherein at least a portion of said first and second depressible portions of said first and second opening members extend laterally outwardly beyond said outer surface of said mobile station.

30. The mobile station of claim 17, further comprising:
first and second lateral edges, wherein said first and second opening members extend adjacent said first and second lateral edges of said mobile station.

31. A method of manufacturing a mobile station, comprising:
providing a first portion;
foldably coupling a second portion to said first portion adjacent a hinge region; and
providing opposed first and second opening members to extend axially from said first portion to said second portion, said first and second opening members defining laterally extending first and second depressible portions disposed on opposite lateral sides of said hinge region, wherein said depressible portions are configured to be responsive to a pinching force that at least partially drives said first and second portions of said mobile station to at least partially open from a folded position.

* * * * *